United States Patent [19]

Sano et al.

[11] Patent Number: 5,781,678
[45] Date of Patent: Jul. 14, 1998

[54] OPTICAL FIBER PATH JOINT MEMBER AND METHOD OF BLOWING OPTICAL FIBER

[75] Inventors: Hiroaki Sano; Hiroki Ishikawa; Tsuyoshi Imaizumi, all of Kanagawa; Kazuo Hogari; Osamu Kawata, both of Ibaraki, all of Japan

[73] Assignees: Sumitomo Electric Industries, Ltd., Osaka; Nippon Telegraph & Telephone Corporation, Tokyo, both of Japan

[21] Appl. No.: 591,370

[22] Filed: Jan. 25, 1996

[30] Foreign Application Priority Data

Jan. 25, 1995 [JP] Japan ............................ 7-009857
Dec. 5, 1995 [JP] Japan ............................ 7-316477

[51] Int. Cl.$^6$ ........................... G02B 6/26; G02B 6/42
[52] U.S. Cl. ................................. 385/45; 226/7
[58] Field of Search ..................... 254/134.4, 134.3; 385/137, 138, 102, 109, 115, 147; 226/97, 1–8; 406/82, 93, 195

[56] References Cited

U.S. PATENT DOCUMENTS

| 4,990,033 | 2/1991 | Handley et al. ............ 406/82 |
| 5,169,568 | 12/1992 | Ainger, III ............ 264/1.5 |
| 5,499,797 | 3/1996 | Sano et al. ............ 254/134.4 |

FOREIGN PATENT DOCUMENTS

| 2-22921 | 5/1990 | Japan . |
| 5-323129 | 12/1993 | Japan . |

*Primary Examiner*—Akm E. Ullah
*Attorney, Agent, or Firm*—Cushman Darby & Cushman IP Group of Pillsbury Madison & Sutro, LLP

[57] ABSTRACT

An optical fiber path joint member according to the present invention includes a main path having an inlet and an outlet at respective ends thereof; and at least one joint path joining to the main path in one direction at an angle of equal to or less than 45°. A method of blowing an optical fiber is comprised of the step of blowing an optical fiber into a pipe through the optical fiber path joint member according to the present invention.

8 Claims, 6 Drawing Sheets

OPTICAL FIBER PATH JOINT MEMBER AND METHOD OF BLOWING OPTICAL FIBER

BACKGROUND OF THE INVENTION

1. Field of the Invention

The present invention relates to a technique for laying optical fibers by blowing them through a pipe. Particularly, the present invention relates to an optical fiber path joint member used for introducing a plurality of optical fibers being blown from respective sub-paths into a main-path so as to insert the plurality of optical fibers into a main duct, and relates to a method of blowing optical fibers through such an optical fiber path joining member.

2. Description of the Related Art

As a blowing technique for optical fibers, it has been known that compressed air is flowed so that the optical fiber is inserted into and blown through the pipe line, as disclosed in Examined Japanese Patent Publication (kokoku) No. Hei. 2-22921. However, this method is a method for laying a single optical fiber in a single pipe line which is empty, and it has therefore a problem that the efficiency of using the space of the pipe line is low.

On the other hand, there is another method in which two branch pipes are join into a main pipe so that two optical fibers are laid in the main pipe, as disclosed in Unexamined Japanese Patent Publication (kokai) No. Hei. 5-323129. In this method, a pipe branch member in which an opening is provided at the center of an U-shaped pipe is used. The main pipe is connected to the center of the U-shaped pipe, and branch pipes are connected to the respective ends of the U-shaped pipe. A rubber pipe portion is provided in each of the branch path of the branch member so that air can be prevent from flowing when the rubber pipe portion is squashed.

In order to insert optical fibers into the pipe branch member, in a condition that the rubber pipe portion of one of the pipe path is squashed to prevent air from flowing into this pipe path, an optical fiber having an air reception portion at its forward end portion is inserted from the main pipe with the aid of an air stream into the other branch path in which its rubber pipe portion is not squashed. Thereafter, in a condition that the rubber pipe portion of the other branch path line is squashed to prevent air from circulation, another optical fiber is inserted from the main pipe with the aid of an air stream into the first branch path in which its rubber pipe portion is not squashed.

In the pipe branch member used in this method, each of the branch path from the end portion of the main pipe line to the branch pipe has a substantially perpendicular curve. It is therefore difficult to send a linear material such as an optical fiber including glass fibers and having rigidity. In addition, since the force due to an air steam acting on an optical fiber is reduced, there is a problem that the forward end of the optical fiber bumps the wall of the path and stops, or the frictional forces between the optical fiber and the U-shaped pipe and between the rubber pipe portion and the wall surface are so large that the insertion resistance is large.

In this case, the word of "pipe branch member" is used, because optical fibers are inserted from the main pipe so that each of optical fibers are inserted into each of branch pipes through each of branch paths of the pipe branch member. However, it is noted that if optical fibers are inserted from each of the branch pipes through each of branch paths of the pipe branch member to the main pipe, the "pipe branch member" becomes a "pipe joint member". Accordingly, the pipe branch member and the pipe joint member have the same structure, but blowing directions of optical fibers are different from each other.

Pipe branching member having a T-shape branch or a Y-shape branch have generally come onto the market as tube-like pipe branch members in which air is made to flow. However, if these pipe branch members are used for inserting optical fibers thereto, even though there is no problem in branching air flow, the same problem as that in the foregoing conventional art still cannot be avoided in inserting optical fibers, so that the performance of insertion at a branch portion cannot be ensured. That is, in a pipe branch member having a T-shape branch shape, even though an optical fiber can be inserted into the horizontal bar portion of the T-shape branch which is a main path, it is still difficult to send an optical fiber into the branch direction perpendicular to the main path. In a pipe branch member having a Y-shape branch, which has paths bent at the angle 90° similarly to the above case of the T-shape branch, it is therefore difficult to send an optical fiber similarly to the case of the pipe branch member having a T-shape branch.

SUMMARY OF THE INVENTION

It is an object of the present invention to provide an optical fiber path joint member in which a plurality of optical fibers from different joint paths are joined into a main duct, and optical fibers can be inserted with a small insertion resistance.

It is another object of the present invention to provide a method of blowing optical fiber in which the above optical fiber path joint member is used so that optical fibers can be additionally laid into a pipe line where other optical fibers have been already laid.

An optical fiber path joint member according to the present invention is comprised of a main path having an inlet and an outlet at respective ends thereof; and at least one joint path joining to the main path in one direction at an angle of equal to or less than 45°.

A method of blowing an optical fiber is comprised of the step of blowing an optical fiber into a pipe through an optical fiber path joint member comprising a main path having an inlet and an outlet at respective ends thereof, the pipe being connected to the outlet, and at least one joint path joining to the main path in one direction at an angle of equal to or less than 45°, wherein the optical fiber is introduced from the joint path to the pipe through the main path.

According to the present invention, a pipe of a main path route can be used by a plurality of coated optical fibers at the same time. Accordingly, the tube space used for the pipe of the main path route can be used effectively, the coated optical fiber holding capability of a tube-gathered cable is increased, and the degree of freedom in the number of coated optical fibers which can be laid in the pipe of the main path route is increased. It is therefore easy to cope with the change of optical communication demand. There is therefore an effect that the optical fiber path joint member may be effectively used in optical lines in end portions in an optical subscriber network the demand of which often changes, or in optical lines in a building which is limited in the space where cables are laid, and which has many branches.

In addition, by use of this optical fiber path joint member, it is possible to easily blow optical fibers into pipe lines newly provided on the way of an existing pipe.

BRIEF DESCRIPTION OF THE DRAWINGS

In the accompanying drawings.

DETAILED DESCRIPTION OF THE INVENTION

Detailed description of the present invention will be described referring to the accompanying drawings as follows.

Figure 1:
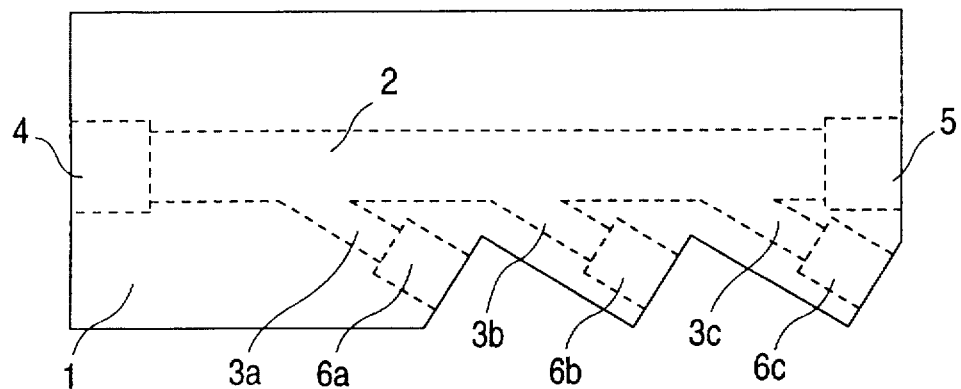
FIG. 1 is a plan view of a first embodiment of an optical fiber path joint member according to the present invention.

FIG. 1 is a plan view of a first embodiment of the present invention. In the drawing, the reference numeral 1 represents an optical fiber path joint member body; 2, a main path; 3a, 3b and 3c, joint paths; 4, an outlet connector; 5, an inlet connector; and 6a, 6b and 6c, joint path inlet connectors.

The main path 2 is provided in the optical fiber path joint member body 1 so as to penetrate the body 1, and the joint paths 3a, 3b and 3c are provided at three joining points on the way of the main path 2, respectively. The outlet connector 4 is provided on the left end portion of the main path 2 in the drawing while the inlet connector 5 is provided on its right end portion in the drawing. The joint path inlet connectors 6a, 6b and 6c are provided on the three joint path 3a, 3b and 3c, respectively. A first main duct and a second main duct, which are not shown in the drawing, are connected to the outlet and inlet connectors 4 and 5, respectively, and not-shown a first to third sub ducts are connected to the joint path inlet connectors 6a, 6b and 6c of the joint paths 3a, 3b and 3c, respectively. Although the inner diameter of the main path 2 may be the same as the inner diameter of each of the joint paths 3a, 3b and 3c, it is preferable, from the point of view of economical design of the pipe line, to make the inner diameter of each of the joint paths 3a, 3b and 3c smaller than the inner diameter of the main path 2. The inner diameters of the outlet and inlet connectors 4 and 5 and the joint path inlet connectors 6a, 6b and 6c are selected correspondingly to those of the main path 2 and the joint paths 3a, 3b and 3c; and ducts to be connected to those connectors are used correspondingly to those connectors.

Each of the joint paths 3a, 3b and 3c communicates with the main path 2 so that the central axis of the former meets that of the latter at a small angle, for example, 30°. An optical fiber to be inserted with an air blowing is guided from one joint path, for example, the joint path 3a, to the main path 2 smoothly, and the optical fiber is not bent largely at the joining point. As a result, even if the optical fiber contacts with the inner wall surface of the path, a large frictional force is not produced in the normal direction against the inner wall surface of the path. Therefore, a plurality of optical fibers can be introduced without any problem even if three optical fibers are inserted from the individual joint paths into the main path 2 with the air blowing sequentially.

The body 1 shown in FIG. 1 has the one main path and the three joint paths 3a, 3b and 3c. However, the number of branch pipe lines is not limited to three, but it may be less or more than three.

As for the optical fibers to be inserted, it is possible to use not only a single coated optical fiber coated with synthetic resin such as nylon, and an optical fiber coated with a foamed material, but also desired optical fibers, such as a tape-shaped coated optical fiber, a bundle of a plurality of optical fibers coated with synthetic resin such as a foamed material, and the like. It is also possible to use an optical fiber having a nylon coating the surface of which has lubricity given by Teflon resin, Teflon wax, silicon oil, or the like. Lubricant of liquid or powder such as talc may be applied in advance onto the inner wall surface of the main path 2 or the joint paths 3a, 3band 3c.

A specific example in the first embodiment will be described. In manufacturing, the inner diameter of the main path 2 was made to be 4.5 mm, and the inner diameter of each of the joint paths 3a, 3b and 3c was made to be 2.5 mm, while the section of each of the paths was made circular. The angle between the main path 2 and the joint paths 3a, 3b and 3c were changed variously. Examinations of insertion were performed on the thus manufactured optical fiber path joint members. The examinations of insertion were performed by use of various kinds of optical fibers, such as a single coated optical fiber coated with nylon and having an outer diameter of 0.9 mm, a tape-shaped bundle of two coated optical fibers each having an outer diameter of 250 µm, a tape-shaped bundle of four coated optical fibers, and the like. As a result, it was found that the angle between the main path 2 and each of the joint paths 3a, 3b and 3c, necessary to introduce an optical fiber, is 45° or less. However, it was found that it is preferable to make the angle be 35° or less in order to insert the optical fiber more smoothly, as will be described later. On the other hand, since the outer diameter of the optical fiber was smaller than any of the outer diameters of the main path and the joint paths, the difference in allowable angle in accordance with the kinds of optical fibers was small.

When an optical fiber is inserted from any of the joint paths 3a, 3b and 3c, the optical fiber to be inserted crosses the section of the main path 2. In addition, when a second optical fiber or a further succeeding one is to be introduced, the optical fiber to be inserted contacts with the optical fiber which has been previously laid, so that frictional resistance is produced there. Although the frictional force produced then is estimated to relate to the easiness of motion of the optical fiber which has been previously laid, it was found by an experiment that the smaller the guiding angle of the optical fiber was, the smaller the frictional force became. In the case where a plurality of optical fibers each having an outer diameter of about 0.7 to 3 mm are to be inserted to the main path 2 and the joint paths 3a, 3b and 3c each having an inner diameter of 2 to 8 mm with the practically used pressure 2 to 9 kg/cm$^2$, it is preferable to select this angle to be 35° or less. It was found that if the paths are coupled at a larger angle than this angle, the first optical fiber and the second optical fiber contact with each other so as to largely reduce the rate of insertion.

The body 1 in this first embodiment has a uniform-height plane structure having two parallel planes between which pipe lines are arranged. Therefore, the body 1 can be manufactured by molding with synthetic resin so as to have holes which will be made to be the main path 2 and the joint paths 3a, 3b and 3c. Alternatively, the body 1 may be manufactured by punching holes in a synthetic resin block, or the body 1 may be manufactured by combining, with an adhesive or screws with each other, upper and lower molded halves of the body 1 divided into two, upper and lower portions by a plane including the central axes of the paths. In this case, the paths are formed as grooves having semi-circular section in the respective molded halves.

After the main path 2 and the joint paths 3a, 3b and 3c are manufactured into pipe-like shapes respectively, those members may be combined with each other, and then integrally molded thereon with synthetic resin, or the like. Alternatively, the portions of the respective paths may be manufactured in the form of blocks of synthetic resin, or the like, and combined with each other so that the respective paths communicate with each other to thereby complete the body 1.

Figure 2:
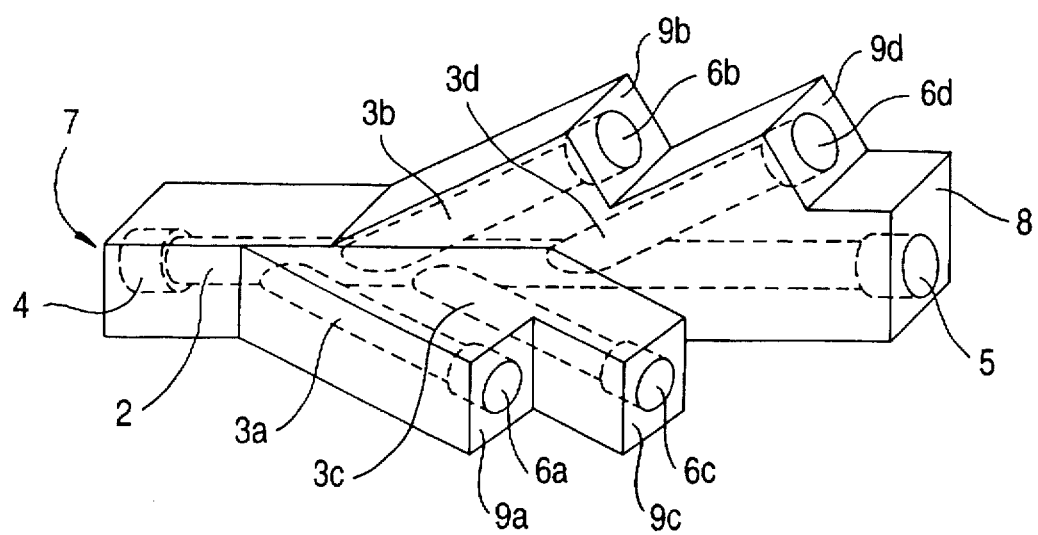
FIG. 2 is a perspective view of a second embodiment of the optical fiber path joint member according to the present invention.

FIG. 2 is a perspective view of a second embodiment of the present invention. In the drawing, the reference numeral 1 represents the body; 2, the main path; 3a, 3b, 3c and 3d, joint paths; 4 and 5, main path connectors; 6a, 6b, 6c and 6d, joint path connectors; 7 and 8, main path connector mounting surfaces; and 9a, 9b, 9c and 9d, joint path connector mounting surfaces.

The body 1 has such a shape that square-section poles are combined. The main path 2 is provided to penetrate from the main path connector mounting surface 7 to the main path connector mounting surface 8 on the opposite side. The four joint paths 3a, 3b, 3c and 3d are provided in this order at four joining points on the way of this main path 2. The joint paths 3a and 3c project from the vertical side surface on this side of the drawing paper while the joint paths 3b and 3d project from the upper surface. The respective joint path connectors 6a, 6b, 6c and 6d are provided on the top ends of the respective joint paths 3a, 3b, 3c and 3d. The end surfaces of the respective joint path connectors 6a, 6b, 6c and 6d meet the respective joint path connector mounting surfaces 9a, 9b, 9c and 9d.

In this embodiment, the joint paths 3a, 3b, 3c and 3d are provided three-dimensionally. Therefore, although the mounting directions of the joint paths are the same with respect to the direction of insertion of the optical fibers into the main path 2 are the same, that is, from the right to the left, the joint paths are joined from the upward, downward, leftward and rightward directions in three dimensions. Accordingly, the joint path connector mounting surfaces 9a, 9b, 9c and 9d can be separated spatially, so that it becomes easy to connect pipe lines of joint path routes to the respective joint path connectors 6a, 6b, 6c and 6d.

The sectional shapes and inner diameters of the main path 2 and the joint paths 3a, 3b, 3c and 3d, and the angles between the main path 2 and the joint paths 3a, 3b, 3c and 3d may be similar to the values in the first embodiment.

Although the body 1 in this embodiment has such a shape that square-section pole-like members are combined with each other, it may have such a shape that circular-section pole-like members are combined with each other. In production, the body 1 may be manufactured in a manner that is molded with synthetic resin into members having holes which will be made to be the main path 2 and the joint paths 3a, 3b, 3c and 3d, and then the molded members are combined onto the part.

Figure 3:
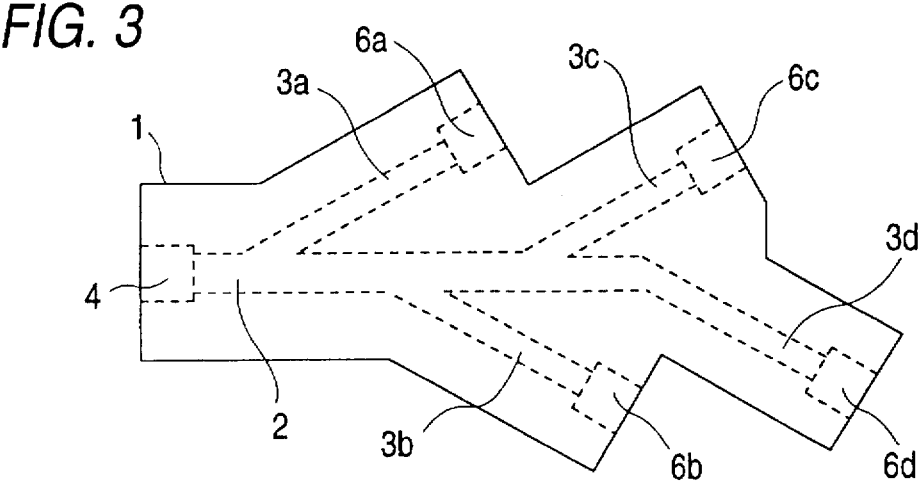
FIG. 3 is a plan view of a third embodiment of the optical fiber path joint member according to the present invention.

FIG. 3 is a plan view of a third embodiment of the present invention. In the drawing, portions corresponding to those in FIGS. 1 and 2 are referenced correspondingly, and the description about them will be therefore omitted. In this embodiment, joint paths 3a, 3b and 3c are joined on the way of a main path 2, and the top end of the main path 2 communicates with a joint path 3d. That is, from the right side, the joint path 3d is joined to the main path 2 at a first joint point at a small angle, the joint path 3c is joined to the main path 2 at a second joint point at a small angle, the joint path 3b is joined to the main path 2 at a third joint point at a small angle, and finally, the joint path 3a is joined to the main path 2 at a fourth joint point at a small angle. In this case, the joint path 3d may be able to be considered as the joint path and the main path.

At each of the joining points in this embodiment, preferably, a joining point is provided so that a joint hole from one of the joint pipe to the main path is disposed not on an extension of the central axis of any other joint paths. For example, the joint hole of the joint path 3a is designed not to be disposed on an extension of the central axis of the opposite joint path 3b. Consequently, the top end of an optical fiber inserted from the joint path 3b comes into contact with the inner wall surface of the main path 2 without entering the joint hole of the opposite joint path 3a. Therefore, the optical fiber can be inserted through the main path line smoothly thereafter.

Also in this embodiment, the sectional shapes and inner diameters of the main path 2 and the joint paths 3a, 3b, 3c and 3d, and the angles between the main path 2 and the joint paths 3a, 3b, 3c and 3d may be made similar to the first embodiment. In addition, the body 1 has a flat-plate shape in the same manner as that in the first embodiment. It is therefore possible to manufacture the body 1 similarly to the first embodiment.

Figure 4:
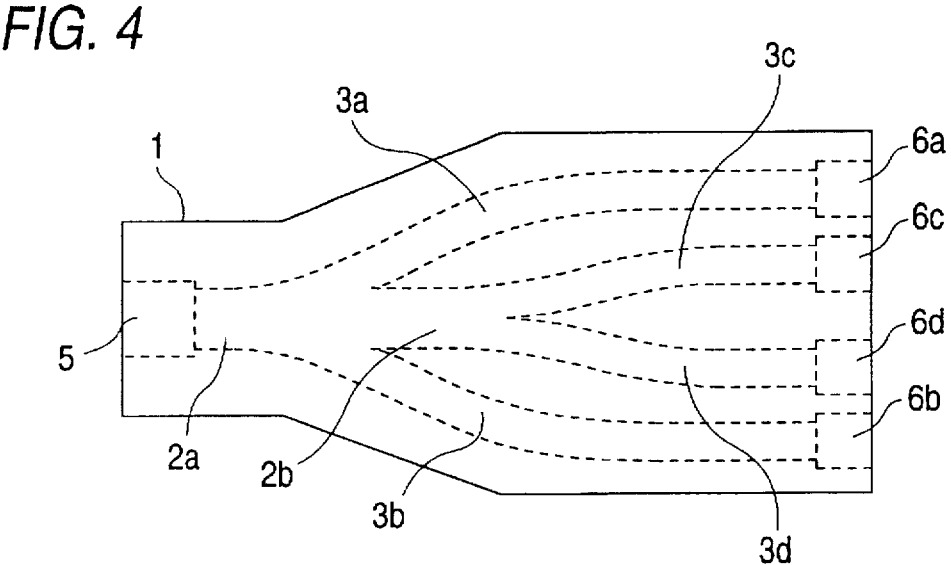
FIG. 4 is a plan view of a fourth embodiment of the optical fiber path joint member according to the present invention.

FIG. 4 is a plan view of a fourth embodiment of the present invention. In the drawing, parts corresponding to those in FIGS. 1 to 3 are referenced correspondingly, and the description about them will be therefore omitted. The reference numerals 2a and 2b represent main path. In this embodiment, the inner diameter of the main path is made to be larger and larger successively at the joining points as seen from the right to the left, and the beginning of the main path is at the first joining point of the joint paths. That is, the joint paths 6c and 6d are joined to each other at the first joining point at a small angle to make the main path 2b, and the joint paths 6a and 6d are joined to the main path 2b at a second joining point at a small angle to make the main path 2a wherein the inner diameter of the main path 2a become larger than that of the main path 2b. Joining similar to the joint path 3a and 3b may be performed at one or more points on the way between the first joining point and the last joining point. In this embodiment, since a pair of branch paths, for example, the branch path 3a and 3b, are provided symmetrically at each of the joining points, the extension of the central axis of one joint path enters the joint hole of the other joint path. Incidentally, in this embodiment, it can be considered that the main path is constituted by the main path 2a, the main path 2b and the joint path 6c or the joint path 6d.

As for a modification of fourth embodiment, the joint paths 3a and 3b are bent outward a little more, respectively, so that the positions of connectors 6a and 6b of the joint paths 3a and 3b are shifted to the outside from the illustrated positions. In such a manner, it is possible to ensure an operating space when pipe members are connected to the connectors 6c and 6d of the inner joint paths 3c and 3d. The joint paths may be made to be joined three-dimensionally at respective joining points as illustrated in the second embodiment.

In this embodiment, since the joint paths 3a, 3b, 3c and 3d are designed to be joined to the main path 2a or 2b with smooth curves, each of the joining paths can communicate with the main path at a smaller angle. There is therefore an advantage that the introduction resistance of the optical fiber can be further reduced. In addition, the body 1 can be designed to have a uniform-height plane structure similarly to the first embodiment, so that it is possible to manufacture the body 1 in the manner similarly to the first embodiment.

Figure 5:
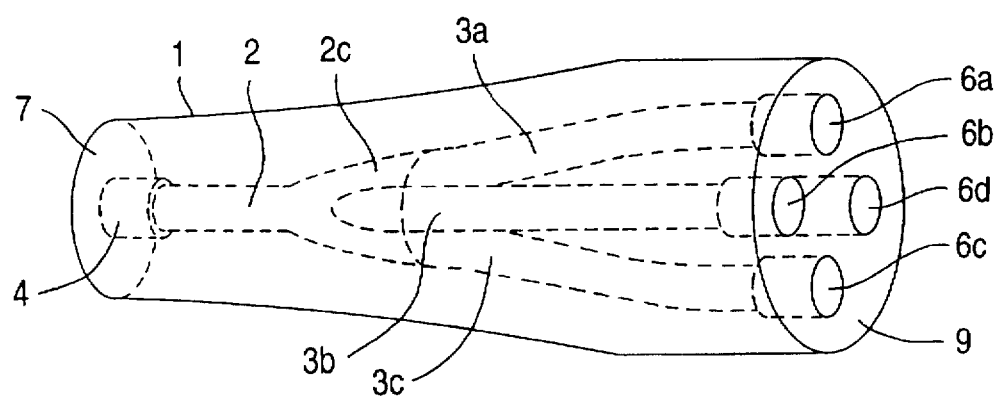
FIG. 5 is a perspective view of a fifth embodiment of the optical fiber path joint member according to the present invention.

FIG. 5 is a perspective view of a fifth embodiment of the present invention. In the drawing, portions corresponding to those in FIGS. 1 to 3 are referenced correspondingly, and the description about them will be therefore omitted. The reference numeral 2c represents an reduced portion which is a part of the main path 2; and 9, a joint path connector mounting surface. In this embodiment, the body 1 has the connector mounting surface 7 in the left of the drawing, and the joint path connector mounting surface 9 in the right of the drawing. From the right side of the drawing, the joint path connectors 6a, 6b, 6c and 6d are provided on the joint path connector mounting surface 9. From these connectors, the joint paths 3a, 3b, 3c and 3d are extended to the reduced portion 2c into which the top end of the joint paths 3a, 3b, 3c and 3d are inserted to be joined with each other. The inner diameter of the reduced portion 2c is smoothly and gradually reduced, and its end is connected to the main path 2. The main path is connected to the main path connector 4 provided on the main path connector mounting surface 7. Also in this embodiment, similarly to the fourth embodiment, the respective joint paths 3a, 3b, 3c and 3d communicate with the main path smoothly at a smaller angle, so that there is no fear that an optical fiber inserted from one of the joint paths enters the hole of any other joint paths. Accordingly, the optical fiber can be advanced into the main path with small introduction resistance. Also, in this case, it can be considered that the main path is constituted by the main path 2, the reduced portion 2c and one of the joint paths 3a, 3b, 3c and 3d.

As for a modification of this embodiment, the inner diameter of the main path may be reduced gradually to taper from the joining portion to the portion of the main path connector 4. In addition, if the inner diameter of the main path 2 is made to just meet the whole outer diameter of the joint paths which are gathered, it is not necessary to provide the enlarged portion 2c. If the latter is made larger than the former, on the contrary, an enlarged portion will be formed.

Figure 6A:
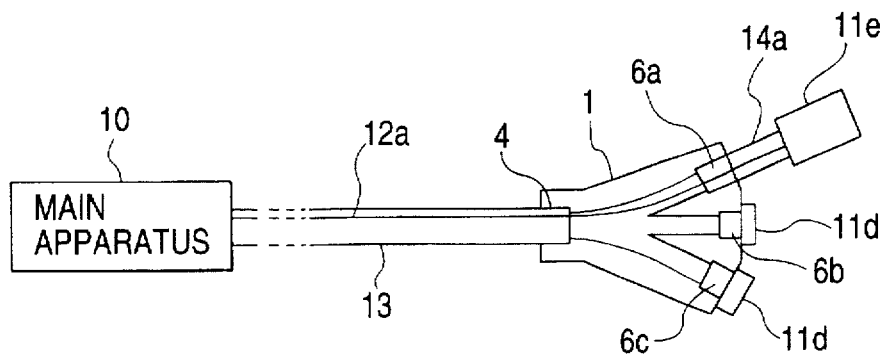
FIGS. 6A to 6C are explanatory diagrams for explaining an example of an optical fiber communication line using the present invention.
Figure 6B:
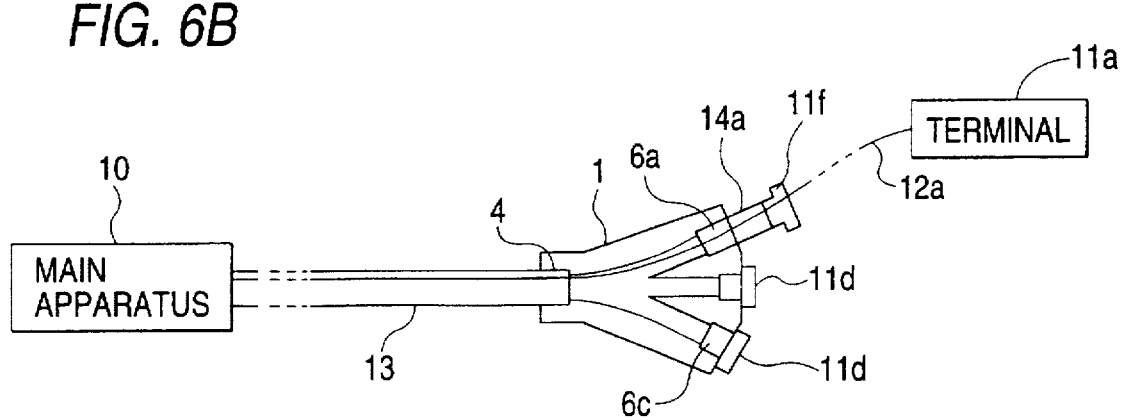
Figure 6C:
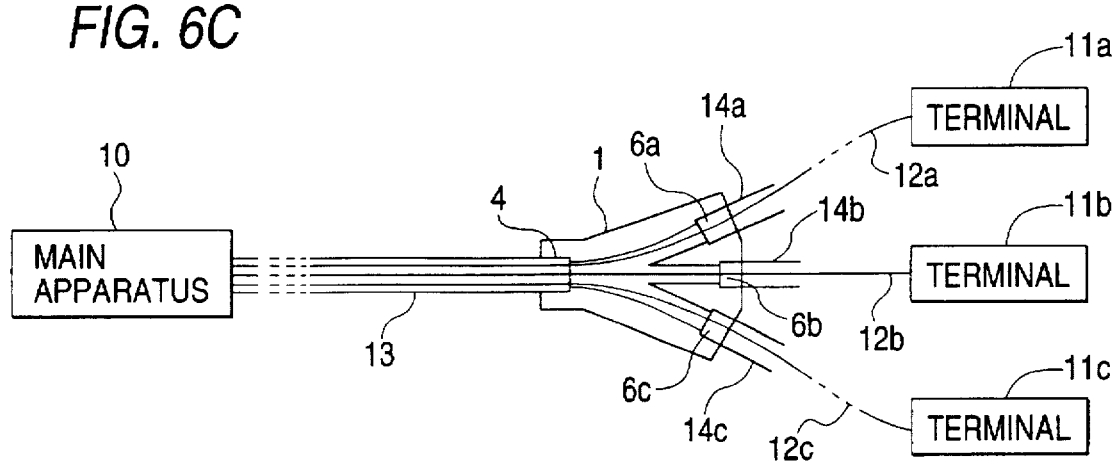

FIGS. 6A to 6C are explanatory diagrams for explaining an example of an optical fiber communication line using the present invention. In the drawing, portions corresponding to those in FIG. 1 are referenced correspondingly, and the description about them will be therefore omitted. The reference numeral 10 represents a main apparatus; 11a, 11b and 11c, terminals; 12a, 12b and 12c, coated optical fibers; 13, a pipe line of a main pipe path route; 14a, 14b and 14c, pipe lines of joint path routes; lid, a cover for closing the joint path connector; 11e, an optical fiber blowing device; and 11f, a cover for closing the pipe line of joint path route.

Assume that only a communication cable between the main apparatus and the terminal 11a is required in the initial laying. In this case, the coated optical fiber 12a blown by the optical fiber blowing device 11e to be introduced from the pipe line 14a of a joint path route through the body 1 to the pipe line 13 of the main path route as shown in FIG. 6A. Then, the optical fiber blowing device 11e is removed and the terminal 11a is mounted, and at this time, the opening of the pipe line 14a is closed by the cover 11f so as to make provision for the optical fiber blowing at another joint path route, as shown in FIG. 6B. After that, at any desired time, the coating optical fibers 12b and 12c may be introduced from the pipe line 14b and 14c of the joint path routes through the body 1 to the pipe line 13 of the main path route in the case where a communication cable between the main apparatus 10 and the terminals 11b and 11c becomes necessary, as shown in FIG. 6C. It is therefore possible to use the pipe line 13 of the main path route for the plurality of coated optical fibers 12a, 12b and 12c at the same time.

In the above embodiments, optical fibers are inserted from joint path into a main path with the air blowing. However, the connection angle of the joint path with respect to the main path is so small that the optical fibers may be inserted from the main path into the joint path with the air blowing. For example, in the first embodiment shown in FIG. 1, the optical fiber may be introduced also from the left side of the main path 2 into the joint path 3 by blocking the air blowing into the right side of the main path 2 and into the joint path 4 and 5.

When the optical fiber path joint member body 1 is constituted by two parts so as to be divided into the two, upper and lower halves, as described in the first embodiment, it is easy to connect the optical fiber path joint member on the way of an existing pipe. For example, a long tube-shaped pipe line made of synthetic resin in which an optical fiber has been laid is cut open at a point where joining is required so as to divide the pipe line. The existing optical fiber is received in the grooves in the upper and lower parts of the body 1, the grooves being made to be the paths. The upper and lower parts are assembled, and the cut-open pipe line is connected. Next, a pipe line of a newly laid joining route is connected to a joint path connector. Thus, a new optical fiber can be additionally inserted thereto.

Figure 7:
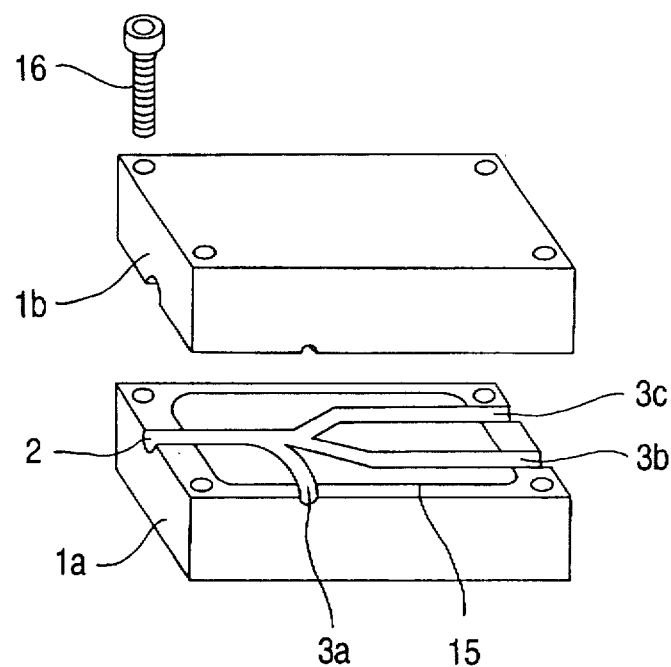
FIG. 7 is a perspective view showing an specific example of the optical fiber path joint member described in the first embodiment which is constituted by molded products divided into two-part.

FIG. 7 is a perspective view showing an specific example of the optical fiber path joint member described in the first embodiment which is constituted by molded products divided into two-part. In the drawing, reference numerals 1a and 1b are optical fiber path joint member body parts; 2, the main path; 3a, 3b and 3c, joint paths; 15, a sealing member; and 16, a set screw.

In this example, the body parts 1a and 1b as an upper and a lower part are fixed to be integrated by the set screws 16. Grooves having a semi-circular shape section is formed on the respective body parts 1a and 1b. An upper and a lower grooves are joined to form the main path 2 and the joint path optical fiber blowing device; 27, a compressed air introducing tube; 28, a supply reel; and 30 and 31, covers.

In this condition, the body part 1b is put on the body part 1a, and they are fixed integrally by the set screws to form the main path 2 and the joint paths 3a, 3b and 3c as circular paths. Incidentally, covers 30 and 31 are provided to the joint path 3a, into which the optical fiber is previously inserted, and the joint path 3c which is out of use, so as to make large the air resistance of the air flow.

In a condition where the body is divided into the body parts 1a and 1b, the pipe 21 is connected to the main path 2 of the body part 1a. The pipe 21 is a single laid pipe or one of a plurality of laid pipes. The optical fiber 21 is previously inserted into the pipe 21. The optical fiber 21 may be in use. The optical fiber 22 is introduced from the main path 2 having a semi-circular section, and is inserted to the joint path 3a. One end of the guide tube 25 is connected to the joint path 3b. The other end of the guide tube 25 is connected to the optical fiber blowing device 26. The compressed air introducing tube 27 is connected to the optical fiber blowing device 26, and the optical fiber 29 is introduced from the supply reel 28.

In this condition, the body part 1b not shown is put on the body part 1a. They are fixed integrally by the set screws as described in FIG. 7 to form the main path 2 and the joint paths 3a, 3b and 3c as circular paths. Incidentally, covers 30 and 31 are provided to the joint path 3a, into which the 3a, 3b and 3c. The joint path 3a is used for an optical fiber which has been laid, and other joint paths 3b and 3c are used for additional optical fibers. Accordingly, the joint path 3a is joined to the main path 2 substantially vertically so that an optical path introduced from the joint path 3a is put near one wall side of the main path 2 while adding optical fiber. However, the joint paths for additional optical fibers may have a shape as similar to the joint path for previously laid optical fiber as shown in FIGS. 1, 3 and 4. When the body parts 1a and 1b are fixed integrally by the set screws 16a, it is preferable to provide the sealing members 15 on the inner surface of the body parts 1a and 1b so as to ensure the air tight of the divided surfaces, thereby preventing leak of the air flow. Preferable sealing member is an elastic member such as a rubber wire, and a groove for receiving the sealing member may be formed on the surface of each of the body parts 1a and 1b.

Figure 8:
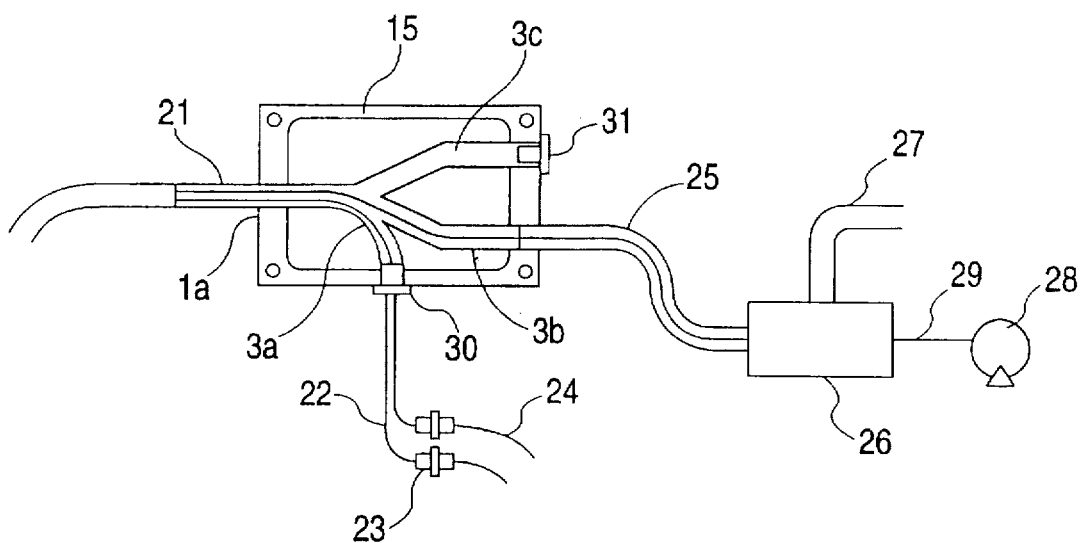
FIG. 8 is a schematic view showing an embodiment of a method of blowing an optical fiber using the optical fiber path joint member shown in FIG. 7.

FIG. 8 is a schematic view showing an embodiment of a method of blowing an optical fiber using the optical fiber path joint member shown in FIG. 7. In the drawing, portions corresponding to those in FIG. 7 are referenced correspondingly, and the description about them will be therefore omitted. In the drawing, reference numeral 21 represents a pipe; 22, an optical fiber; 23, an optical connector; 24, an optical fiber; 25, a guide tube; 26, an optical fiber is previously inserted, and the joint path 3c which is out of use, so as to make large the air resistance of the air flow.

Figure 9A:
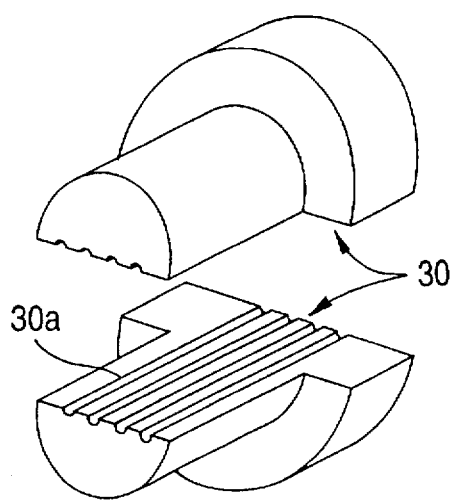
FIG. 9A is a perspective view showing an example of a cover used for the path to which an optical fiber is inserted.
Figure 9B:
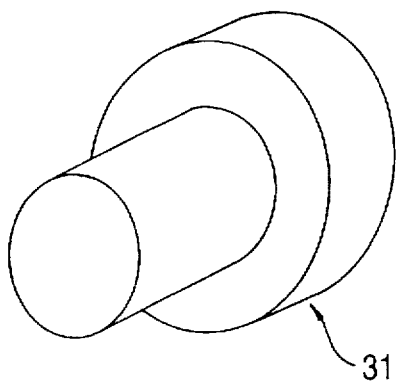
FIG. 9B is a perspective view showing an example of the cover used for the path which is out of use.

FIG. 9A is a perspective view showing an example of the cover used for the path to which the optical fiber is previously inserted, and FIG. 9B is a perspective view showing an example of the cover used for the path which is out of use. They may be made of an elastic member such as rubber. A cover 30 used for the path to which the optical fiber is previously inserted is divided into two-part. Both divided surfaces are provided with grooves 30a where the optical fibers can be pass through. In the drawing, four grooves are formed, and two optical fibers are passed through the grooves. However, even if openings are formed, a little leak causes no problem. In addition, if the cover 30 is formed of an elastic member such as rubber, the grooves to which the optical fibers are not inserted are pushed to close openings. Incidentally, the cover 31 used for the path which is out of use is not necessary to be divided. The cover 31 is formed as a single member as shown in FIG. 9B.

Explanation will be forwarded with returning to FIG. 8. In a condition where the body parts 1a and 1b are fixed integrally, the pipe 21 is connected to the main path 2, and the optical fiber 21 which is previously laid in the pipe 21 is introduced from the joint path 3a to the outside through the cover 30. The joint path 3b is connected to the end of the guide tube 25 connected to the optical fiber blowing device 26, and the joint path 3c is closed airtightly and sealed by the cover 31. In this condition, while the optical fiber 29 is introduced from the supply reel 28 to the optical fiber blowing device 26, and a roller incorporated in the device 26 sends the optical fiber 29 to the side of the guide tube 25, the optical fiber is blown by the air from the compressed air introducing tube 27 so that the optical fiber is blown from the joint path 3b to the pipe 21 through the main path 2.

After additionally laying the optical fiber 29 into the pipe 21, the optical fiber path join member is divided into the body parts 1a and 1b so that the optical fiber 22 is taken out and the body parts 1a and 1b are removed, thereby returning to the original condition. Incidentally, the additionally laid optical fiber 29 is cut at the side of the supply reel 28, and thereafter, is pulled from the optical fiber blowing device 28, so that parts such as the joint member is not remained at the side of the pipe 21 to have an economic advantage. As described, since the parts for adding the optical fiber is not necessary to be remained, the size of a connecting case for housing the terminal can be reduced.

As described above, after adding one optical fiber 29, this optical fiber 29 is inserted together with the previously laid optical fiber 22 into the joint path 3a. The same operation may be repeated so as to insert further additional optical fibers.

Figure 10:
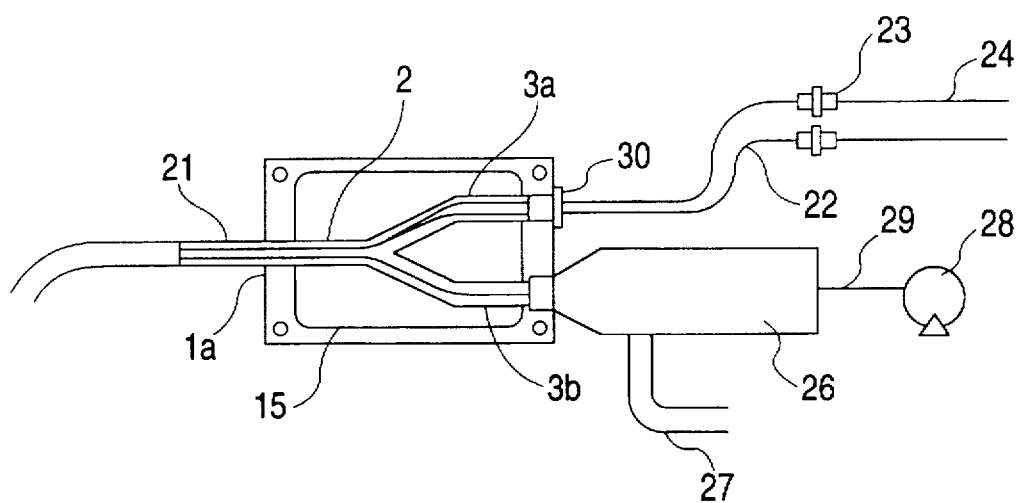
FIG. 10 is a schematic view showing another embodiment of a method of blowing an optical fiber using the similar optical fiber path joint member shown in FIG. 7.

FIG. 10 is a schematic view showing another embodiment of a method of blowing an optical fiber using the similar optical fiber path joint member shown in FIG. 7 which is divided into two part. In the drawing, portions corresponding to those in FIG. 8 are referenced correspondingly, and the description about them will be therefore omitted. In this embodiment, the optical fiber blowing device 26 is directly connected to the joint path 3b. The optical fiber path joint member is provided with two joint path 3a and 3b, and the optical fibers 22 and 24 are previously inserted into the joint path 3a. The divided-type cover 30 shown in FIG. 9A is provided to the end of the joint path 3a. In this embodiment, the number of the joint path is minimized, that is, two paths, and the compressed air introducing tube is not necessary because the optical fiber blowing device 26 is directly connected to the joint path 3b. Therefore, the size of the member and the device can be reduced. If necessary, the number of the joint path may be three or more.

Figure 11:
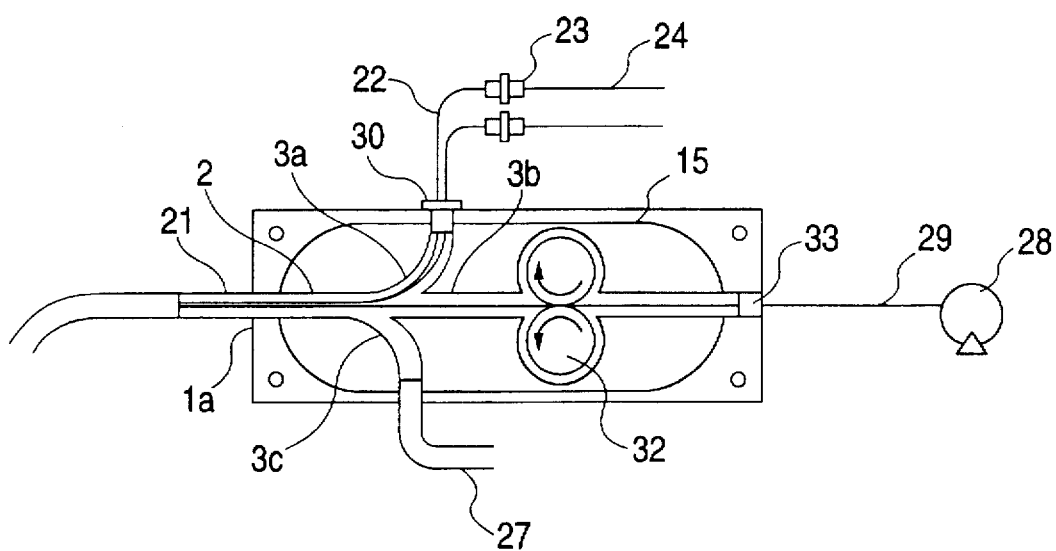
FIG. 11 is a schematic view showing another embodiment of a method of blowing an optical fiber using the similar optical fiber path joint member shown in FIG. 7.

FIG. 11 is a schematic view showing another embodiment of a method of blowing an optical fiber using the similar optical fiber path joint member shown in FIG. 7 which is divided into two-part. In the drawing, portions corresponding to those in FIG. 8 are referenced correspondingly, and the description about them will be therefore omitted.

As similar to FIGS. 8 and 10, FIG. 11 is a schematic view of the body part 1a. Accordingly, the main path and the joint paths have a semi-circular section. The body part 1b is put on and fixed to the body 1a so as to form the circular main path and joint paths. The driving portion for sending an optical fiber is sealed airtightly. In this embodiment, the joint path 3b is used for adding the optical fiber 29, and rollers 32 is provided. In addition, the compressed air introducing tube 27 is connected to the joint path 3c so as to introduce the air flow. Consequently, the optical fiber blowing apparatus is incorporated into the optical fiber path joint member, so that the size of the apparatus can be further reduced and the capacity thereof is similar to the apparatus of another embodiment.

What is claimed is:

1. A method of blowing an optical fiber into a pipe comprising the steps of:

providing an optical fiber path joint member defining a main path, the joint member having an inlet and an outlet at respective ends thereof and at least one joint path joining to said main path at an angle of equal to or less than 45°, connecting a first portion of the pipe to said outlet, connecting a second portion of the pipe to said inlet, and introducing said optical fiber into said joint path and blowing it therethrough and into the pipe via said main path.

2. A method of blowing an optical fiber according to claim 1, wherein said optical fiber path joint member comprising a plurality of joint paths joining to said main path in one direction at an angle of equal to or less than 45°.

3. A method of blowing an optical fiber according to claim 2, further comprising the step of, before said blowing step, sealing said main path and said joint paths.

4. A method of blowing an optical fiber comprising the steps of:

preparing an optical fiber path joint member which is divided into a first and second body parts, wherein a groove is formed on each of surfaces of said first and second body parts, and said groove forms a main path having an inlet and an outlet at respective ends thereof and at least one joint path joining to said main path in one direction at an angle of equal to or less than 45° when said first and second body parts are assembled;

cutting a pipe in which an optical fiber is previously laid;

assembling said first and second parts to form said optical fiber path joint member at the position where said pipe is cut, while passing said previously laid optical fiber in said main path;

connecting said main path to said pipe through said inlet and outlet, while connecting a joint pipe to said joint path; and blowing an optical fiber from the side of said joint pipe to said pipe through said joint path and main path.

5. A method of blowing an optical fiber according to claim 4, wherein said optical fiber path joint member is provided with a plurality of join paths.

6. A method of blowing an optical fiber according to claim 5, further comprising the steps of, before said blowing step, sealing said main path and said joint paths.

7. A method of blowing an optical fiber comprising the steps of:

preparing an optical fiber path joint member which is divided into a first and second body parts, wherein a groove is formed on each of surfaces of said first and second body parts, and said groove forms a main path having an inlet and an outlet at respective ends thereof and at least one joint path joining to said main path in one direction at an angle of equal to or less than 45° when said first and second body parts are assembled;

assembling said first and second parts to form said optical fiber path joint member at an end of a pipe where at least one optical fiber which is previously laid in said pipe is introduced out, while passing said previously laid optical fiber in at least one of said main path and said at least one joint path;

sealing said main path and said at least one joint path; and blowing an optical fiber from one of said at least one joint path to said pipe through said main path.

8. A method of blowing an optical fiber according to claim 7, wherein said optical fiber path joint member is provided with a plurality of join paths.

* * * * *